United States Patent [19]

Hojo et al.

[11] Patent Number: 4,708,024
[45] Date of Patent: Nov. 24, 1987

[54] GYRO APPARATUS

[75] Inventors: Takeshi Hojo; Takafumi Nakaishi, both of Kuroiso, Japan

[73] Assignee: Kabushikikaisha Tokyo Keiki, Tokyo, Japan

[21] Appl. No.: 871,876

[22] Filed: Jun. 9, 1986

[30] Foreign Application Priority Data

Jun. 10, 1985 [JP] Japan .................................. 60-125867

[51] Int. Cl.$^4$ ....................... G01C 19/30; G01C 19/38
[52] U.S. Cl. ....................................... 74/5.47; 33/327; 74/5.9
[58] Field of Search ...................... 74/5.9, 5.47; 33/327

[56] References Cited

U.S. PATENT DOCUMENTS

| | | | |
|---|---|---|---|
| 1,725,317 | 8/1929 | Tanner | 33/327 |
| 1,739,251 | 12/1929 | Mills | 33/327 |
| 1,866,733 | 7/1932 | Tanner | 33/327 |
| 2,677,194 | 5/1954 | Bishop | 74/5.9 X |
| 3,212,196 | 10/1965 | Carter | 74/5.9 X |
| 3,290,787 | 12/1966 | Brugger | 33/327 |
| 3,327,541 | 6/1967 | Clark et al. | 74/5.47 X |
| 3,855,711 | 12/1974 | Kawada et al. | 33/327 |

Primary Examiner—Rodney H. Bonck
Attorney, Agent, or Firm—Hill, Van Santen, Steadman & Simpson

[57] ABSTRACT

A gyro apparatus comprising a gyro casing incorporating therein a gyro the spin axis of which is made substantially horizontal, a supporting apparatus for supporting the gyro casing with a freedom of three axes, a north-seeking apparatus for giving a north-seeking action to the gyro, a follow-up ring having a follow-up shaft which follows the gyro casing around its substantially vertical axis, a binnacle for supporting the follow-up shaft, a servo motor for rotating the follow-up shaft and a slip ring for supplying a power to the gyro and the like through the follow-up shaft, in which the follow-up ring is formed as a fork-shape and supported to the binnacle in a canti-lever fashion, the follow-up shaft is rotatably supported to the binnacle by one thin-type ball bearing having a large diameter and one bearing having a small diameter, the follow-up shaft is fixedly provided with a rotor of a pancake-type servo motor of a direct drive system, a stator of the servo motor is attached to the binnacle at the position corresponding to the rotor and a slip ring is attached to the binnacle at the outer periphery of the servo motor.

5 Claims, 8 Drawing Figures

GYRO APPARATUS

BACKGROUND OF THE INVENTION

1. Field of the Invention

The present invention relates generally to gyro apparatus and, more particularly, is directed to a gyro apparatus of a small size which can be mounted on a ship and also on a land navigation vehicle.

2. Description of the Prior Art

An outline of a prior art gyro apparatus previously proposed by the present applicant of the invention (see, for example, U.S. Pat. No. 3,855,711) will be described briefly with reference to FIGS. 1 to 5.

In FIG. 1, reference numeral 1 designates a gyro casing or housing which incorporates therein a gyro rotor rotating at a high speed and which is formed as a liquid-tight structure. Reference numeral 2 designates a container or receptacle container like a tank which surrounds the gyro casing 1. Reference numeral 3 designates a suspension wire which supports the gyro casing 1. The upper end of the supension wire 3 is fixed to the container 2 and the lower end thereof is fixed to the gyro casing 1. Reference numerals 4N, 4S and 5N, 5S respectively designate primary sides and secondary sides of a non-contact type displacement detecting apparatus 6. The primary sides 4N and 4S are respectively attached on the surface of, for example, the gyro casing 1 at intersections where the extended line of the spin axis of the gyro intersects the surface of the gyro casing 1, that is, the north side and the south side of the gyro. While, the secondary sides 5N and 5S are respectively attached to the container 2 at its positions corresponding to the primary sides 4N and 4S. Reference numeral 7 designates a liquid such as a damping oil or the like having a high viscosity and this liquid 7 is filled into the container 2. At the positions (east and west) on the equator of the container 2 and perpendicular to the spin axis, there are attached one ends of a pair of horizontal axes 8 and 8', while the other ends thereof are rotatably engaged with bearings 13 and 13' which are provided at the corresponding positions of a horizontal ring 12. Reference numeral 10 designates a horizontal follow-up servo motor and which is attached to the horizontal ring 12. A horizontal gear 9 is attached to one horizontal shaft 8 and this horizontal gear 9 is engaged with a horizontal pinion 11 which is mounted to the rotary shaft of the servo motor 10. Gimbal shafts 14 and 14' are respectively attached to the horizontal ring 12 at its positions perpendicular to the afore-mentioned horizontal shaft bearings 13 and 13'. These gimbal shafts 14 and 14' are rotatably engaged with gimbal shaft bearings 15 and 15' which are attached to a follow-up ring 16 at corresponding positions, respectively. To the upper end and the lower end of the follow-up ring 16, there are attached follow-up shafts 17 and 17' the free ends of which are rotatably engaged with follow-up shaft bearings 25 and 25' mounted on a binnacle 24 at its corresponding positions. An azimuth gear 21 is attached to one follow-up shaft 17. Reference numeral 19 designates an azimuth follow-up servo motor mounted on the binnacle 24 and reference numeral 20 designate an azimuth pinion attached to the rotary shaft of the azimuth follow-up servo motor 19. This azimuth pinion 20 is engaged with an azimuth gear 21. Reference numeral 22 designates a compass card which is attached to the follow-up shaft 17'. Reference numeral 23 designates a base line plate attached on the upper surface of the binnacle 24 so as to oppose to the compass card 22. By a base line 26 drawn on the central portion of the base line plate 23 and the compass card 22, it is possible to read the course of the navigation vehicle which is equipped with this gyro apparatus.

Subsequently, one practical example of the above mentioned non-contact type displacement detecting apparatus 6 used in this prior art gyro apparatus will be described with reference to FIGS. 2 and 3. FIG. 2 shows one set at the N (north) side thereof. As shown in FIG. 2, the primary side (4N) is made as one primary winding, in which the winding wire is located within the plane perpendicular to the spin axis of the gyro rotor and is generally excited by an alternate current which is used commonly by a gyro current source to thereby form alternate magnetic fields shown by broken line arrows a1 and a1'. Similarly, the secondary side (5N) is formed of 4 rectangular windings 5NW, 5NE, 5NU and 5NL, in which the pair of windings 5NW and 5NE are located in parallel to each other in the lateral direction, while another pair of the windings 5NU and 5NL are located in the up and down direction. The winding starting ends of the pair of the windings 5NW and 5NE and the winding starting ends of the pair of the windings 5NU and 5NL are connected to one another. Let it now be considered that the primary winding 4N, that is, the gyro casing 1 be positioned at the center of the secondary winding 5N, that is, the container 2. Then, since the magnetic flux generated by the primary winding 4N penetrates each of 4 secondary windings 5NW, 5NE, 5NU and 5NL, voltages are induced at the respective 4 windings 5NW, 5NE, 5NU and 5NL in response to the voltages. However, since the changes of the magnetic flux in each of the four secondary windings 5NW, 5NE, 5NU and 5NL are substantially the same and also the respective pairs of the windings are connected in a differential fashion as described above, no voltage is generated at their output terminals 2-1 and 2-2 at all. When the primary winding 4N, is deviated in, for example, the east (shown by E in FIG. 2), the magnetic flux penetrating the secondary winding 5NE is increased while the magnetic flux penetrating the secondary winding 5NW is decreased. As a result, although the voltage is generated at the output terminal 2-1, no voltage is generated at the output terminal 2-2.

On the other hand, when the primary winding 4N is deviated in the west (shown by W in FIG. 2), contrary to the above, the induced voltage of the secondary winding 5NW is increased and the induced voltage of the secondary winding 5NE is decreased so that a voltage having a phase opposite to that of the case where the primary winding 4N is deviated in the east is generated at the terminal 2-1. In this case, since the secondary windings 5NU and 5NL are located in the up and down direction, no output voltage is generated at the output terminal 2-2 similary as described above. Whereas, when the primary winding 4N is displaced in the up and down direction, although no output voltage is generated at the secondary windings 5NW and 5NE which are located in the lateral direction, the voltage is generated at the secondary windings 5NL and 5NU located in the vertical direction so that the output voltage is generated at the terminal 2-2. In other words, according to the gyro apparatus having the structure shown in FIG. 1, it is possible to detect the displacement of the gyro casing 1 at the N end in the east-and-west direction and the up-and-down direction relative to the container 2.

FIG. 3 shows only the detecting apparatus which detects the displacement in the east-and-west direction and FIG. 3 is a location diagram showing the gyro casing 1 from the top thereof. Specifically, the displacement detecting apparatus at the S side is formed of a primary winding 4S and secondary windings 5SE and 5SW. When the gyro casing 1 is deviated in the east, the magnetic flux passing through the secondary winding 5SE is increased, while the magnetic field passing through the secondary winding 5SW is decreased so that a voltage is induced in the terminal 3-1. The phase of this voltage is selected to be the same as that of the voltage developed at the terminal 2-1 of the secondary windings 5NW and 5NE. Further, as shown in FIG. 3, the secondary windings 5SE, 5SW and 5NE, 5NW are further connected in a differential fashion so that when the gyro casing 1 is displaced in the east-and-west direction, no voltage is developed at a terminal 3-2, while when the gyro casing 1 generates an angular displacement around a vertical axis line O (vertical to the sheet of drawing), an output voltage having a phase inverted by 180° is generated at the terminal 3-2 in response to the rotation direction of the gyro casing 1.

This output voltage from the terminal 3-2 is supplied through a servo amplifier 30 (or may be supplied directly) to the control winding of the azimuth servo motor 19. The rotation of the aziumth servo motor 19 is transmitted through the azimuth pinion 20, the azimuth gear 21, the follow-up ring 16 and the horizontal ring 12 to the container 2, whereby this container 2 is controlled such that the angular displacement thereof around the above described vertical axis line becomes zero. In other words, whatever direction the gyro casing 1 is displaced in, the suspension wire 3 can be perfectly prevented from being twisted by this servo system. Thus, the gyro apparatus can be protected from the application of an external disturbance with respect to its vertical axis. In FIG. 3, reference numeral 3-3 designates an error correction signal generating apparatus which generates a voltage corresponding to the speed of the ship or its latitude, displaces the follow-up operation of the azimuth follow-up system to thereby twist the suspension wire 3 and applies a torque around the vertical axis of the gyro apparatus to thereby correct the error.

FIG. 4 shows the horizontal follow-up system, in which the windings 5NU, 5NL and 5SU and 5SL of the secondary sides 5N and 5S are connected in a differential fashion similarly as described above. Accordingly, no output voltage is generated at a terminal 4-1 of the secondary windings 5NU and 5NL when the gyro casing 1 is moved in parallel to the container 2 in the up and down direction, while a voltage is generated at the terminal 4-1 relative to the angular movement around the horizontal axis. This output voltage is supplied through a servo amplifier 31 (or may be supplied directly) to the control winding of the horizontal follow-up servo motor 10. The rotation of the horizontal follow-up servo motor 10 is transmitted through the horizontal pinion 11 and the horizontal gear 9 to the container 2 and thereby the container 2 is rotated. Thus, the above described angular displacement of the container 2 is made zero.

FIG. 5 schematically illustrates the inside of the container 2. In this case, the north-seeking end (A) side (existing on the gyro casing 1) extended from the spin axis of the gyro rotor GR within the gyro casing 1 is inclined upwardly by an angle $\theta$ relative to the horizontal plane H—H'. Here, $O_1$ assumes the center of gravity of the gyro casing 1, Q assumes the connection point of the suspension wire 3 and the gyro casing 1, P assumes the connection point of the suspension wire 3 and the container 2 and $O_2$ assumes the center of the container 2. Further, let it be assumed that when the spin axis of the gyro rotor GR within the gyro casing 1 is horizontal ($\theta=0$), the center of graity $O_1$ of that the gyro casing 1 is coincident with the center of the container 2. Furthermore, A assumes the north-seeking end, B assumes points spaced apart by 180° on the gyro casing 1 and A' and B' respectively assume points on the container 2 and which are corresponding to the points A and B.

Since the suspension wire 3 has a flexural rigidity in practice, it presents a flexed curve as shown by a broken line in FIG. 5. Accordingly, it is appreciated that the axis direction moving amount $\xi$ ($O_2$ to $O_1$) of the gyro casing 1 relative to the container 2 be reduced very slightly. However, in the practical design, this influence is very small so that the description will be made under the assumption that the suspension wire 3 be perfectly flexible. Since the points A' and B' on the container 2 and the points A and B on the gyro casing 1 are arranged by the action of the servo system so as to always exist on the same straight line as mentioned before, the container 2 is also inclined by the angle $\theta$ relative to the horizontal plane H—H' similarly to the gyro casing 1. Now, let it be assumed that no external acceleration be applied to the gyro apparatus. Then, since no external force is applied to the gyro casing 1 in spin axis direction of the gyro rotor GR, the suspension wire 3 coincides with the vertical line. If the tension of the suspension wire 3 is taken as T and the residual mass of the gyro casing 1 except the bouyancy applied thereto by the damping liquid 7 is taken as mg, the tension T of the suspension wire 3 generates around the point $O_1$ a moment M expressed as $$M = Tr \sin\theta = mg\, r \sin\theta$$

This moment M is applied to the gyro as the torque around the horizontal axis (which passes through the point $O_1$ and is perpendicular to the sheet of drawing). In the above equation, reference letter r designates a distance between the center of gravity $O_1$ of the gyro casing 1 and the connection point Q of the suspension wire 3 and the gyro casing 1 as shown in FIG. 5. In other words, according to this method, it is possible to "apply the torque proportional to the inclination of the spin axis relative to the horizontal plane to the gyro around its horizontal axis". Therefore, if the cycle or the period of the north-seeking movement of the gyro is determined in a range from several 10s minutes to one hundred and several 10s minutes by selecting the distance r, the residual mass mg and the angular momentum of the gyro, it becomes possible to obtain a gyro compass.

However, if the above mentioned gyro compass is further miniaturized so as to be mounted on a smaller navigation vehicle, there occurs drastic difficulty. The first difficulty is that the gyro compass is strongly required to be high in precision. Generally, in the gyro apparatus such as gyro compass and the like, the property of the gyro apparatus is substantially determined by the ratio between the disturbing torque and the angular momentum of the gyro, that is, the drift rate of the gyro.

To miniaturize the gyro apparatus means that the dimension of the outer diameter of the gyro rotor must be reduced necessarily. In this case, since the angular momentum of the gyro rotor is in proportional to the fourth power of the outer diameter of the gyro, if the disturbing torque is constant, to miniaturize the gyro apparatus means the rapid increase of the drift rate of the gyro. As a result, it becomes impossible to satisfy the system property of the gyro apparatus.

The second difficulty is caused by the structure of the gyro, particularly the structures and arrangements of the gimbal, the servo motor, the slip ring, the bearing and so on. If the assembly and the arrangement thereof and so on are not taken into a deliberate consideration, it is yet very difficult to miniaturize the gyro compass.

OBJECTS AND SUMMARY OF THE INVENTION

Accordingly, it is an object of this invention to provide an improved gyro apparatus.

It is another object of this invention to provide an improved gyro apparatus which can be miniaturized considerably.

It is further object of this invention to provide an improved gyro apparatus which is very high in precision.

It is still further object of this invention to provide an improved gyro apparatus which is very suitable for use not only with ships but also with land navigation vehicles.

According to one aspect of the present invention, there is provided a gyro apparatus comprising:

(a) a gyro casing incorporating therein a gyro the spin axis of which is made substantially horizontal;

(b) a supporting apparatus for supporting said gyro casing with a freedom of three axes;

(c) a north-seeking apparatus for giving a north-seeking action to said gyro;

(d) a follow-up ring having a follow-up shaft which follows said gyro casing around its substantially vertical axis;

(e) a binnacle for supporting said follow-up shaft;

(f) a servo motor for rotating said follow-up shaft and a slip ring for supplying a power to said gyro and the like through said follow-up shaft, said follow-up ring being formed as a fork-shape and being supported to said binnacle in a canti-lever fashion, said follow-up shaft being rotatably supported to said binnacle by one thin-type ball bearing having a large diameter and one bearing having a small diameter;

(g) a pancake-type servo motor of a direct drive system, a rotor of said servo motor being fixed to said follow-up shaft, a stator of said servo motor being attached to said binnacle at a position corresponding to said rotor; and (h) a slip ring attached to said binnacle at the outer periphery of said servo motor.

These and other objects, features and advantages of the present invention will become apparent from the follow-up detailed description of the preferred embodiment taken in conjunction with the accompanying drawings, throughout which like reference numerals designate like elements and parts.

DESCRIPTION OF THE PREFERRED EMBODIMENT

Figure 1:
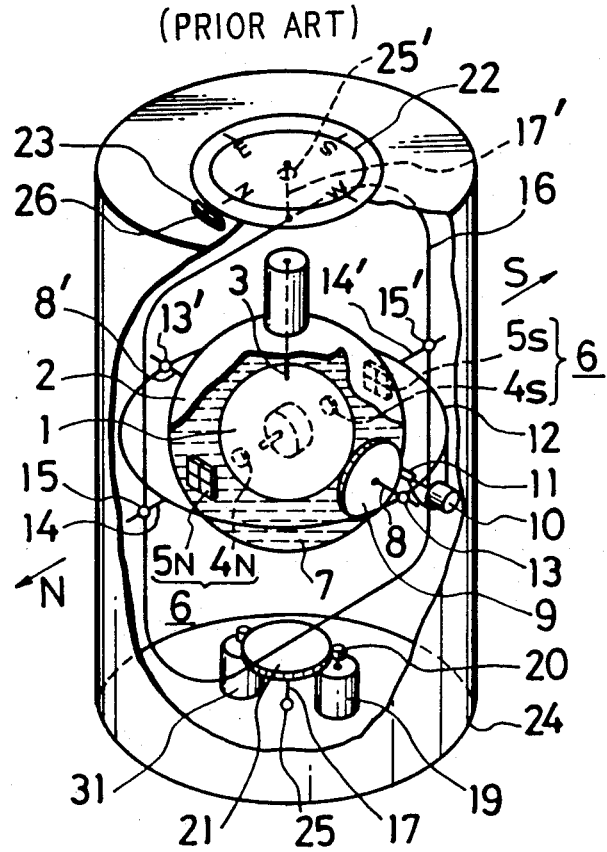
FIG. 1 is a schematic perspective view of an example of a prior art gyro compass.
Figure 2:
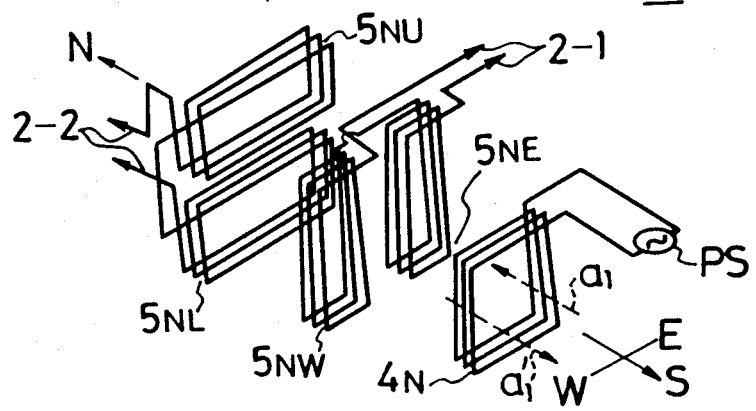
FIG. 2 is a schematic representation of a displacement detecting apparatus used in the gyro compass in FIG. 1.
Figure 3:
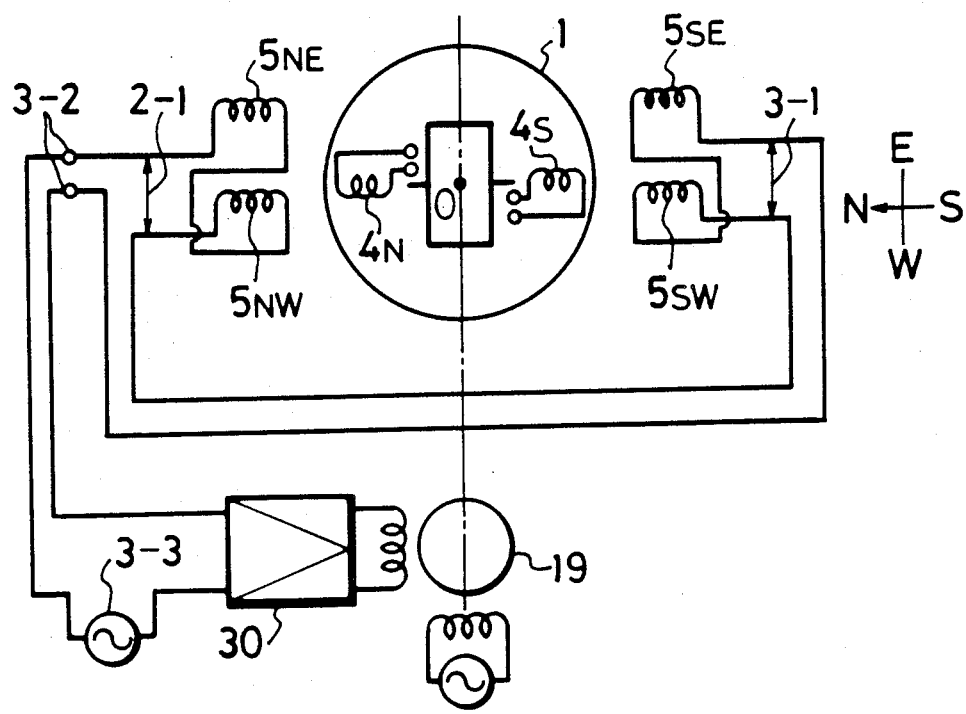
FIG. 3 is a schematic representation of an azimuth follow-up system used in the gyro compass shown in FIG. 1.
Figure 6:
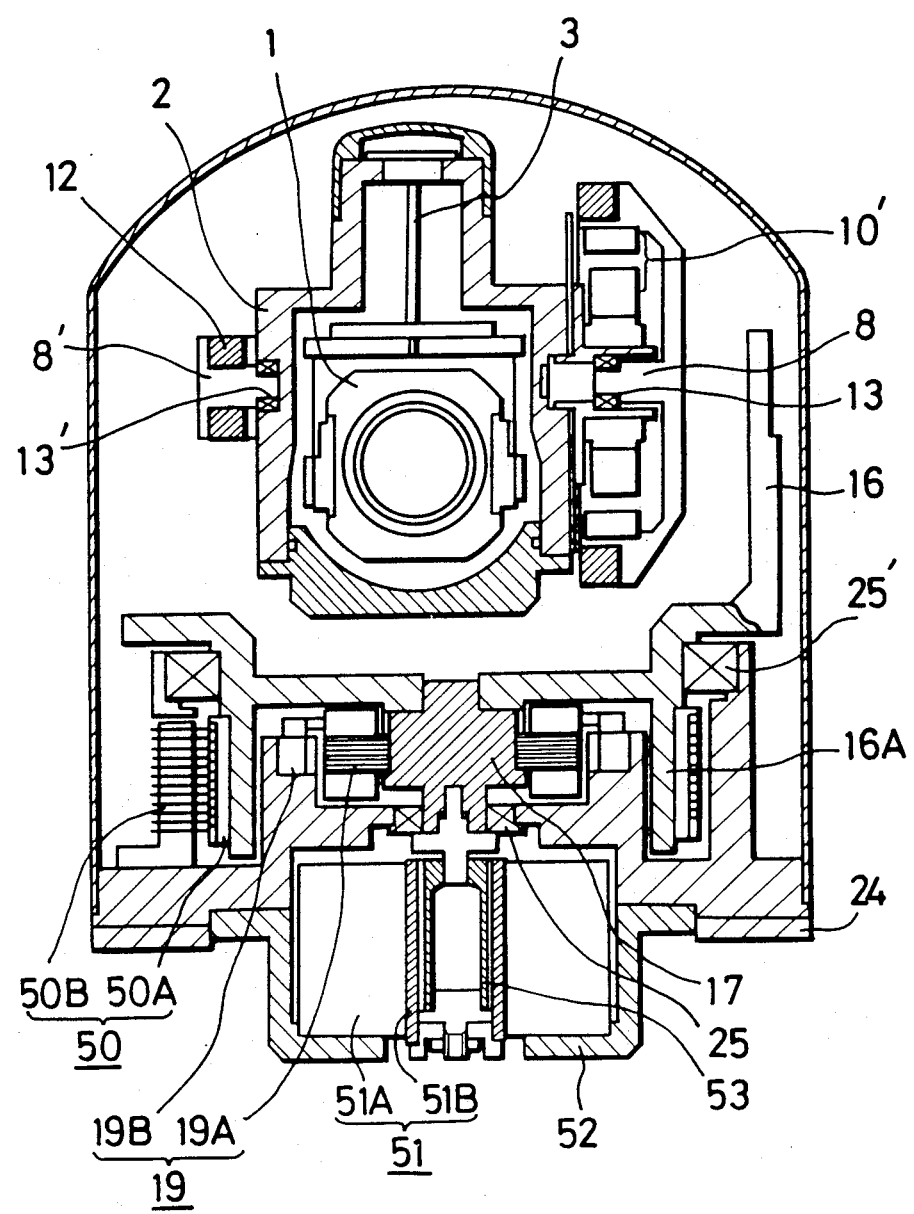
FIG. 6 is a cross-sectional view showing one embodiment of a gyro apparatus according to the present invention.
Figure 7:
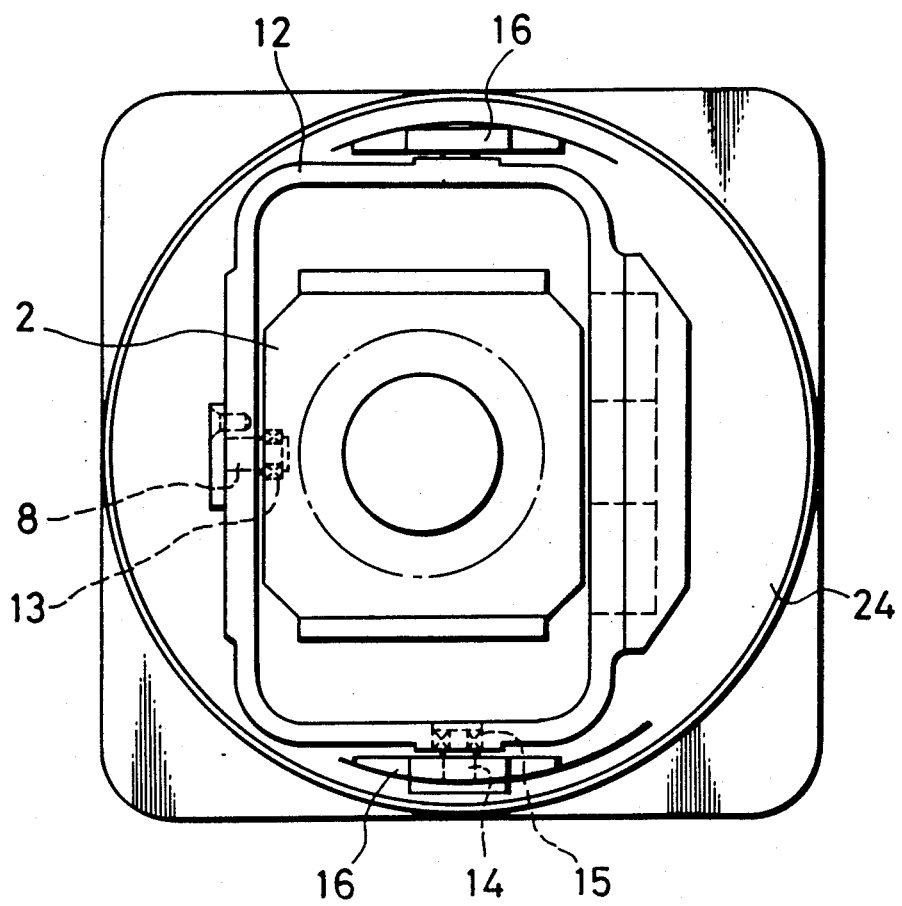
FIG. 7 is a top view thereof.

Referring now to FIGS. 6 and 7, one embodiment of the gyro apparatus according to this invention will hereinafter be described in detail. FIG. 6 is a cross-sectional view showing one embodiment of the invention and FIG. 7 is a top view thereof. In FIGS. 6 and 7, like parts corresponding to those of FIG. 1 are marked with the same references and will not be described.

In FIGS. 6 and 7, reference numeral 10' designates a pancake-type horizontal servo motor which is attached to the horizontal shaft 8 of the horizontal ring 12. Since this pancake-type horizontal servo motor 10' is of a direct drive system, the horizontal pinion 11, the horizontal gear 9 and the like used in the prior art example of FIG. 1 are not required and hence, they are removed. The follow-up ring 16 is not formed as an annular shape but as a fork-shape (one arm is not shown in FIG. 6) because of the miniaturization of the gyro apparatus. Since the follow-up shaft 17 fixed to the follow-up ring 16 is supported by a thin-type ball bearing 25' having a large diameter and a ball bearing 25 having a small diameter, the follow-up ring 16 is supported from the binnacle 24 in a canti-lever fashion. To the follow-up shaft 17, there is fixedly mounted a rotor 19A of a pancake-type azimuth servo motor 19, while there is also fixedly mounted a stator 19B of the azimuth servo motor 19 to the binnacle 24 at its corresponding position, respectively. The follow-up ring 16 is provided at the outer peripheral portion of the above mentioned servo motor 19 with a skirt portion 16A protruded in the downward direction. To the outer peripheral portion of the skirt portion 16A, there is fixed a current collecting ring 50A of a slip ring 50. Further, a brush 50B is fixedly mounted on the binnacle 24 at its position corresponding to the above mentioned current collecting ring 50A. Through these ring 50A, brush 50B and the like, a current is supplied to the gyro rotor, the horizontal servo motor 10' and so on.

To the lower portion of the binnacle 24, there is attached a housing member 51A of an azimuth encoder 51 through an attaching member 52. On the other hand, to the follow-up shaft 17, there is coupled a shaft 51B of the azimuth encoder 51 through a coupling 53. Accordingly, the azimuth encoder 51 generates an azimuth angle of the follow-up ring 16 relative to the binnacle 24.

In FIG. 6, reference numerals 60, 61 designate magnetic shield plates for preventing the magnetic flux of the horizontal servo motor from penetrating into the gyro casing 1. Reference numeral 62 denotes a magnetic shield plate for preventing the magnetic flux of the azimuth servo motor 19 from penetrating into the gyro casing 1. In FIGS. 6 and 7, reference numerals 63, 64 and 65 designate magnetic shield plates for preventing the external magnetic flux from penetrating into the gyro casing 1. Each of the magnetic shield plate 60 to 65 is made of high permeability material such as permalloy. In FIGS. 6 and 7, reference numeral 66 denotes a housing or cap which is attached to the binnacle 24 and is made of high permeability material, too, to prevent the external magnetic flux from penetrating into the gyro casing 1.

The horizontal follow-up system of the present invention will now be described with reference to FIG. 8. This horizontal follow-up system is made by inserting a follow-up point correcting signal generating apparatus 4-2 into the signal path between the terminal 4-1 and the servo amplifier 31 of the prior art shown in FIG. 4. The follow-up point correcting signal generating apparatus 4-2 is to make an offset in the follow-up operation of the horizontal follow-up system so as to arbitrarily set the offset angle of the gyro casing 1 relative to the container 2.

Figure 4:
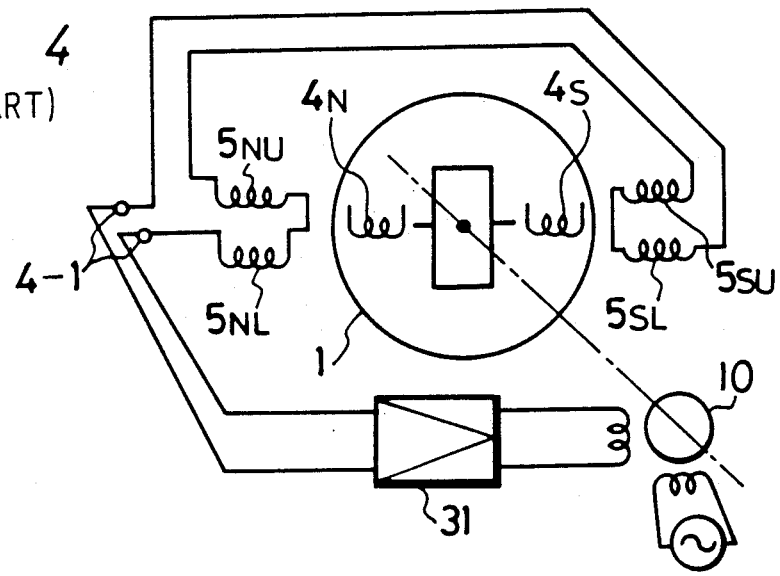
FIG. 4 is a schematic representation of a horizontal follow-up system of the gyro compass shown in FIG. 1.
Figure 5:
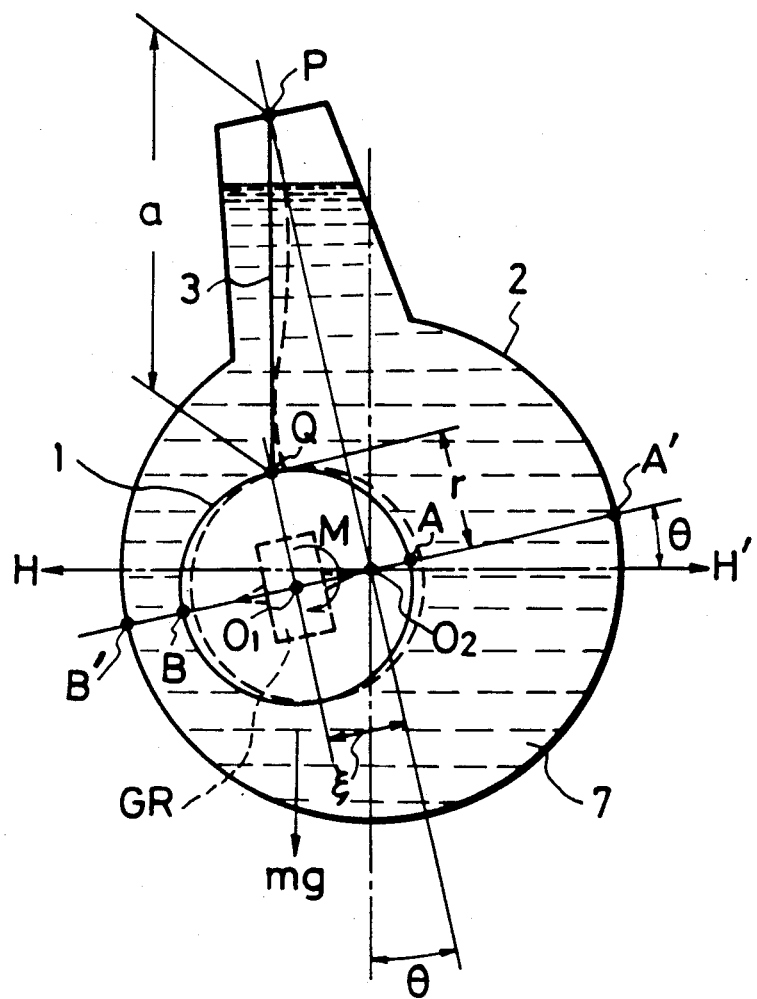
FIG. 5 is a schematic representation used to explain the north-seeking principle of the gyro compass shown in FIG. 1.

In the prior art shown in FIG. 4, the horizontal follow-up system is constructed such that the above mentioned offset angle is always made zero. Accordingly, when an unbalance occurs in the gyro casing 1 about the horizontal axis and hence the gyro casing 1 is inclined considerably about the horizontal axis, the container or tank 2 is also inclined so as to follow the inclination of the gyro casing 1. Accordingly, the gyro casing 1, which is suspended by the suspension wire 3, is moved to the down side of the inclination. When the inclination of the container 2 is very large, the gyro casing 1 becomes in contact with the container 2, so that the function of the gyro is disturbed. In the prior art shown in FIG. 4, in order to avoid the above trouble, the horizontal axis must be adjusted accurately.

Figure 8:
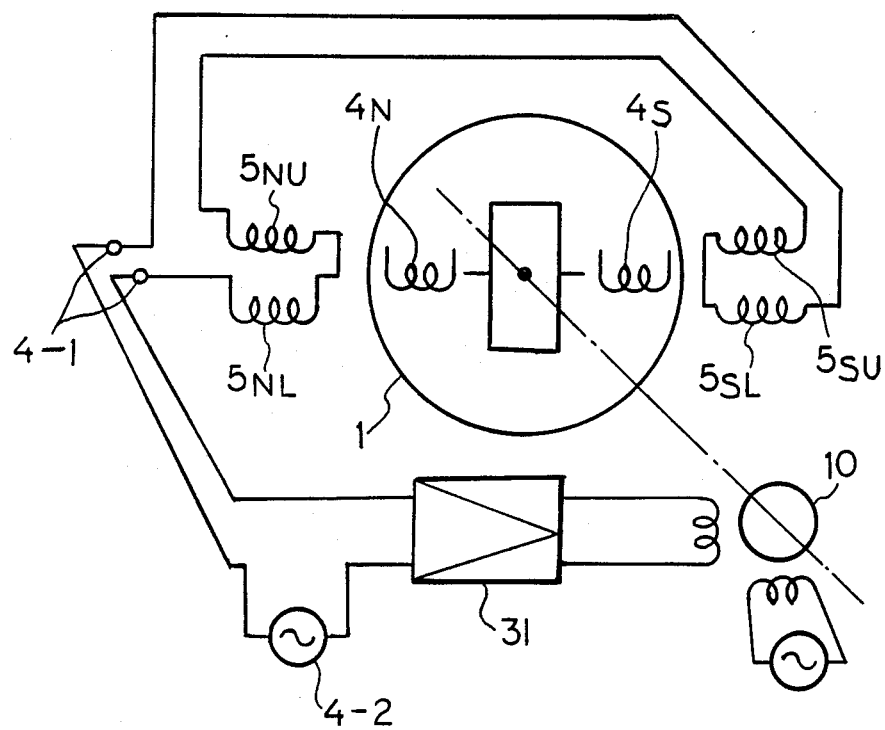
FIG. 8 is a schematic representation showing a horizontal follow-up system of the present invention.

While, according to the horizontal follow-up system of the present invention shown in FIG. 8, since the follow-up point correcting signal generating apparatus 4-2 is provided, the follow-up point of the horizontal follow-up system can be set to a desired point. Therefore, even if the gyro casing 1 is inclined by the unbalance thereof, the tank 2 can be prevented by making a suitable offset in the follow-up point of the horizontal follow-up system from being inclined. Thus, in the horizontal follow-up system of the present invention shown in FIG. 8, the accurate balance adjustment of the gyro casing 1, which is required by the prior art shown in FIG. 4, becomes unnecessary.

According to the gyro apparatus of the invention, since the thin-type bearing 25' having the large diameter and the bearing 25 having the small diameter are used as the bearing of the follow-up shaft 17 to thereby support the follow-up ring 16 in a canti-lever fashion relative to the binnacle 24, the pancake-type servo motor 19 is located inside the follow-up ring 16, the slip ring 50 is located in the outside thereof and the azimuth encoder 51 used to generate the azimuth angle is attached through the coupling to the shaft end of the follow-up shaft 17, the gyro apparatus of the invention can be miniaturized considerably.

Further, since the pancake-type servo motor of the direct drive system having no gear system is used as the horizontal and vertical servo motors, the follow-up speed and the follow-up precision can be improved considerably with the result that in addition to the use as the azimuth standard ships, the gyro apparatus of the invention can be used with other vehicles, such as, land navigation vehicles having large rotational movements and large rotational angular speeds. In addition, the present invention can greatly improve the precision of the gyro apparatus.

The above description is given on a single preferred embodiment of the invention but it will be apparent that many modifications and variations could be effected by one skilled in the art without departing from the spirits or scope of the novel concepts of the invention so that the scope of the invention should be determined by the appended claims only.

We claim as our invention:

1. A gyro apparatus comprising:
   (a) a gyro casing incorporating therein a gyro the spin axis of which is made substantially horizontal;
   (b) a supporting apparatus for supporting said gyro casing with a freedom of three axes;
   (c) a north-seeking apparatus for giving a north-seeking action to said gyro;
   (d) a follow-up ring having a follow-up shaft at its center which follows said gyro casing around its substantially vertical axis;
   (e) a binnacle for supporting said follow-up shaft;
   (f) a servo motor for rotating said follow-up shaft and a slip ring for supplying power to said gyro through said slip ring, said follow-up ring being formed as fork-shaped and having a downwardly protruded skirt portion at the outer peripheral portion of said servo motor and being rotatably supported by said binnacle with a first ball bearing which is located at the outer periphery of said skirt portion, in a cantilever fashion, and said follow-up shaft being rotatably supported by said binnacle through a second ball bearing which has a smaller diameter than said first ball bearing; said servo motor being of a pancake-type servo motor of a direct drive system, a rotor of said servo motor being fixed to said follow-up shaft between said first and second ball bearings, a stator of said servo motor being attached to said binnacle at a position corresponding to said rotor; and
   (g) a slip ring attached to the outer periphery of said skirt portion.

2. A gyro apparatus according to claim 1 further comprising means for preventing a magnetic flux of said servo motor from penetrating into said gyro casing.

3. A gyro apparatus according to claim 1 further comprising means for preventing an external magnetic flux from penetrating into said gryo casing.

4. A gyro apparatus according to claim 1 further comprising a horizontal follow-up system having a horizontal servo motor and means for making an offset in said horizontal follow-up system.

5. A gyro apparatus according to claim 4 further comprising means for preventing a magnetic flux of said horizontal servo motor from penetrating into said gyro casing.

* * * * *